(12) United States Patent
Lauster

(10) Patent No.: US 10,231,109 B2
(45) Date of Patent: Mar. 12, 2019

(54) HANDLING OF EMERGENCY CALLS IN A ROAMING SCENARIO

(71) Applicant: Deutsche Telekom AG, Bonn (DE)

(72) Inventor: Reinhard Lauster, St. Poelten (AT)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 15/543,578

(22) PCT Filed: Nov. 27, 2015

(86) PCT No.: PCT/EP2015/077911
§ 371 (c)(1),
(2) Date: Jul. 14, 2017

(87) PCT Pub. No.: WO2016/113028
PCT Pub. Date: Jul. 21, 2016

(65) Prior Publication Data
US 2017/0374107 A1  Dec. 28, 2017

(30) Foreign Application Priority Data

Jan. 15, 2015 (EP) ..................... 15151293

(51) Int. Cl.
*H04W 4/00* (2018.01)
*H04W 4/90* (2018.01)
(Continued)

(52) U.S. Cl.
CPC ............. *H04W 4/90* (2018.02); *H04L 65/102* (2013.01); *H04L 65/105* (2013.01);
(Continued)

(58) Field of Classification Search
CPC ......... H04W 4/90; H04W 76/50; H04W 8/02; H04L 65/1006; H04L 65/1016; H04L 65/102; H04L 65/105; H04L 65/1069
See application file for complete search history.

(56) References Cited

U.S. PATENT DOCUMENTS

2005/0233727 A1* 10/2005 Poikselka ............... H04W 4/02
455/404.2
2010/0048160 A1* 2/2010 Lekutai ................... H04W 4/90
455/404.1
(Continued)

FOREIGN PATENT DOCUMENTS

EP  1502469 A1  2/2005
EP  2026513 A1  2/2009

OTHER PUBLICATIONS

"Universal Mobile Telecommunications System (UMTS); LTE; IP Multimedia Subsystem (IMS) emergency sessions (3GPP TS 23.167 version 12.0.0 Release 12)", Technical Specification, European Telecommunications Standards Institute (ETSI), 650, Route Des Lucioles; F-06921 Sophia-Antipolis; France, vol. 3GPP SA 2, No. V12.0.0, Sep. 1, 2014 (Sep. 1, 2014), XP014223462.

*Primary Examiner* — Khai M Nguyen
(74) *Attorney, Agent, or Firm* — Leydig, Voit & Mayer, Ltd.

(57) ABSTRACT

A method for improved handling of emergency calls in a roaming scenario includes: a voice call being initiated by the user equipment via the user equipment transmitting a first message directed to a network node of the home telecommunications network, the first message comprising the specific emergency call telephone number; wherein a second message is transmitted to the network node of the home telecommunications network, the second message comprising an emergency call information, the emergency call information being indicative of the use of a valid emergency (Continued)

call telephone number in relation of the voice call; and a third message being generated by the node of the home telecommunications network, wherein the third message is transmitted to a network node of the visited telecommunications network, and forwarded, as a fourth message, to the user equipment to trigger an emergency call procedure.

12 Claims, 1 Drawing Sheet

(51) Int. Cl.
*H04W 76/50* (2018.01)
*H04L 29/06* (2006.01)
*H04W 8/02* (2009.01)
H04L 29/12 (2006.01)
H04M 3/42 (2006.01)
H04Q 3/00 (2006.01)

(52) U.S. Cl.
CPC ...... *H04L 65/1006* (2013.01); *H04L 65/1016* (2013.01); *H04L 65/1069* (2013.01); *H04W 8/02* (2013.01); *H04W 76/50* (2018.02); H04L 61/3085 (2013.01); H04M 3/42272 (2013.01); H04M 2242/04 (2013.01); H04Q 3/0029 (2013.01)

(56) References Cited

U.S. PATENT DOCUMENTS

| | | | |
|---|---|---|---|
| 2014/0148117 A1* | 5/2014 | Basore | H04W 4/90 455/404.1 |
| 2018/0192264 A1* | 7/2018 | Kwok | H04W 4/90 |

\* cited by examiner

HANDLING OF EMERGENCY CALLS IN A ROAMING SCENARIO

CROSS-REFERENCE TO PRIOR APPLICATIONS

This application is a U.S. National Phase application under 35 U.S.C. § 371 of International Application No. PCT/EP2015/077911, filed on Nov. 27, 2015, and claims benefit to European Patent Application No. EP 15151293.6, filed on Jan. 15, 2015. The International Application was published in English on Jul. 21, 2016 as WO 2016/113028 A1 under PCT Article 21(2).

FIELD

The present invention relates a method for improved handling of emergency calls in a roaming scenario, wherein a user equipment is assigned to a home telecommunications network and wherein the user equipment is connected to a visited telecommunications network, wherein the proxy functionality of the home telecommunications network is used in the roaming scenario, wherein a voice call is initiated by the user equipment using a specific emergency call telephone number being a valid emergency call telephone number in the visited telecommunications network but wherein the user equipment in unaware of the specific emergency call telephone number being a valid emergency call telephone number in the visited telecommunications network (corresponding to the so-called non-UE detected emergency calls).

Furthermore, the present invention relates to a system, a telecommunications network and/or a network node for improved handling of emergency calls in a roaming scenario, wherein a user equipment is assigned to a home telecommunications network and wherein the user equipment is connected to a visited telecommunications network, wherein the proxy functionality of the home telecommunications network is used in the roaming scenario.

Additionally, the present invention relates to a program and to a computer program product for improved handling of emergency calls in a roaming scenario, wherein a user equipment is assigned to a home telecommunications network and wherein the user equipment is connected to a visited telecommunications network, wherein the proxy functionality of the home telecommunications network is used in the roaming scenario.

The present invention relates to the area of both wireless and nomadic or fixed communications.

BACKGROUND

To support large numbers of (roaming) subscribers—e.g. mobile subscribers or nomadic, i.e. temporarily fixed subscribers—a number of telecommunications networks such as public land mobile networks and/or stationary (fixed line) networks have been established and are operative. Telecommunications networks such as public land mobile networks (PLMNs) may communicatively connect to other mobile telecommunications networks and/or to fixed, land-wired public switched telephone networks (PSTNs) and/or to data networks such as the internet (or IP-networks, internet protocol networks). User equipments (e.g. a mobile or nomadic terminal) are typically assigned to a home telecommunications network, such as a home public land mobile network. In a roaming scenario, the user equipment is typically not located in reach of the home telecommunications network (or home public land mobile network) but is connected to a visited telecommunications network (or visited public land mobile network). Most modern telecommunications network (such as public land mobile networks or also data networks) are packet-switched networks, in which data are routed in autonomous units called data packets. Packet-switched networks are characterized by high speed, low latency, and high network resource utilization efficiency. Two examples of packet-switched technologies are the General Packet Radio Service (GPRS) of the Global System for Mobile communications (GSM), and the Evolved Packet System (EPS), also commercially known as the Long Term Evolution (LTE), of the Universal Mobile Telecommunications System (UMTS), wireless local area network (WLAN). The Internet Protocol (IP) is a widely-deployed protocol for data communications in packet-switched networks. The IP Multimedia System (IMS) is an industry standard framework for delivering voice and multimedia communications over IP networks. Communications between nodes within an IMS network utilize the Session Initiation Protocol (SIP). SIP is a signaling protocol for Internet conferencing, telephony, presence, events notification, instant messaging, and the like. SIP signaling uses a long-term stable identifier, the SIP Universal Resource Indicator (URI). SIP signaling data packets in an IMS network are processed by network node of the telecommunications network, usually also called SIP servers or proxies. Together, these network nodes provide a call session control function (CSCF). Different types of such CSCF network nodes perform specific functions: A proxy call session control function (P-CSCF) is a SIP proxy that is the first point of contact for a user equipment (or an IMS terminal). Typically, the proxy call session control function that a user equipment uses is located in the visited telecommunications network in case that local breakout is used. In case local breakout is not used, the proxy call session control function a user equipment normally uses is located in the home telecommunications network (i.e. the proxy call session control function is part of or is assigned to the home telecommunications network).

Also IMS-enabled user equipments need to be able to place emergency calls even when located in (and connected to) a visited telecommunications network. Non-UE-detected emergency calls (i.e. emergency calls that are placed (or initiated) by the user equipment which are emergency calls in the network environment of the user equipment (i.e. the visited telecommunications network) that the user equipment is unaware of, e.g. due to the use of an emergency call telephone number (valid in the visited telecommunications network) that is not maintained in a list within the user equipment) are relatively easy to handle in case of the use of local breakout: In this case, the local proxy call session control function (i.e. the proxy call session control function of the visited telecommunications network) has a list of the local emergency numbers (of the visited telecommunications network or valid with in the respective context of the user equipment in the visited telecommunications network), and is hence able to detect the call type (i.e. the emergency type of an emergency call) and apply the needed procedures to guarantee successful handling of the requested emergency service.

In scenarios where no local breakout is to be used, and each call is routed to (a respective proxy call session control function within) the home telecommunications network, there is only the possibility to maintain a (normally huge) list of local emergency numbers (that are applicable or valid within the different telecommunications networks of all the possible roaming partners of the home telecommunications network) with a mapping to the related uniform resource names of the emergency call telephone numbers (also called sos-uniform resource names) in the local network node or the home telecommunications network (typically a proxy call session control function of the home telecommunications network). The maintenance of such a database for all roaming partners worldwide requires a considerable effort and—hence—is very costly.

SUMMARY

In an embodiment, the present invention provides a method for improved handling of emergency calls in a roaming scenario. A user equipment is assigned to a home telecommunications network and the user equipment is connected to a visited telecommunications network. A proxy functionality of the home telecommunications network is used in the roaming scenario. A voice call is initiated by the user equipment using a specific emergency call telephone number. The specific emergency call telephone number is a valid emergency call telephone number in the visited telecommunications network. The user equipment initially handles the voice call as a normal voice call. The method includes: in a first step, the voice call is initiated by the user equipment via the user equipment transmitting a first message directed to a network node of the home telecommunications network, the first message comprising the specific emergency call telephone number; in a second step, subsequent to the first step, the specific emergency call telephone number is detected by a telephone number detecting network node of the visited telecommunications network, wherein a second message is transmitted to the network node of the home telecommunications network, the second message comprising an emergency call information, the emergency call information being indicative of the use of a valid emergency call telephone number in relation of the voice call; and in a third step, subsequent to the second step, a third message is generated by the node of the home telecommunications network, the third message being directed to the user equipment, wherein the third message is transmitted to a network node of the visited telecommunications network, and forwarded, as a fourth message, to the user equipment, the third and fourth messages comprising an indication, to the user equipment, to trigger an emergency call procedure in accordance to the configuration of the visited telecommunications network via a fifth message.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
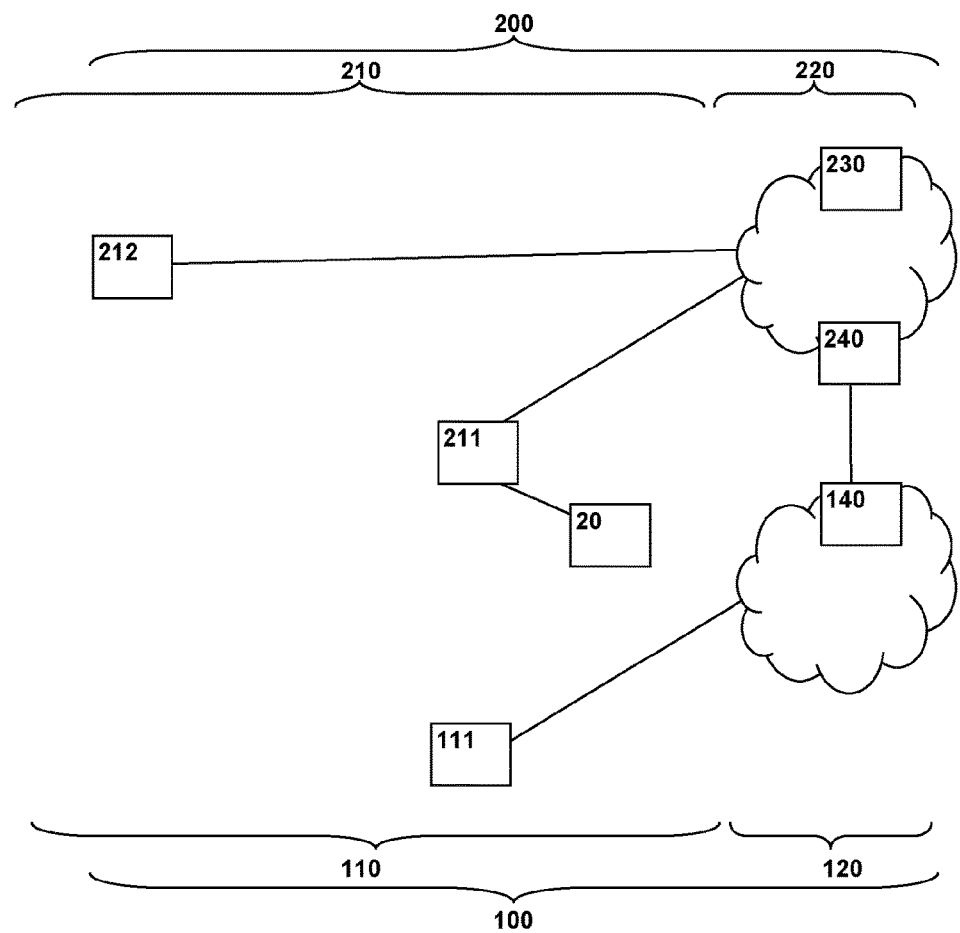
FIG. 1 schematically illustrates a system according to the present invention, comprising a first telecommunications network (or home telecommunications network) and a second telecommunications network (or visited telecommunications network), and a user equipment connected to the visited telecommunications network.

Exemplary embodiments of the present invention provide an effective and simple solution (especially reducing operational costs (OPEX costs)) to identify local emergency calls in roaming situations (without local breakout) without the need to maintain an important database for all roaming partners worldwide within the home telecommunications network of the user equipment, and without the need to rely on user equipment implementation when providing numbers to the user equipment.

In an exemplary embodiment, the present invention provides a method for improved handling of emergency calls in a roaming scenario, wherein a user equipment is assigned to a home telecommunications network and wherein the user equipment is connected to a visited telecommunications network, wherein the proxy functionality of the home telecommunications network is used in the roaming scenario, wherein a voice call is initiated by the user equipment using a specific emergency call telephone number being a valid emergency call telephone number in the visited telecommunications network, wherein the user equipment initially handles the voice call—involving the specific emergency call telephone number—as a normal voice call (non-UE detected emergency call), wherein the method comprises the steps of:

in a first step, the voice call is initiated by the user equipment via the user equipment transmitting a first message directed to a network node of the home telecommunications network, the first message comprising the specific emergency call telephone number, wherein the specific emergency call telephone number is detected by a telephone number detecting network node of the visited telecommunications network, in a second step, subsequent to the first step, a second message is transmitted to the network node home telecommunications network, the second message comprising an emergency call information, the emergency call information being indicative of the use of a valid emergency call telephone number in relation of the voice call, in a third step, subsequent to the second step, a third message is generated by the node of the home telecommunications network, the third message being directed to the user equipment, wherein the third message is transmitted to a network node of the visited telecommunications network, and forwarded, as a fourth message, to the user equipment, the third and fourth messages comprising an indication, to the user equipment, to trigger an emergency call procedure in accordance to the configuration of the visited telecommunications network via a fifth message.

It is thereby advantageously possible according to the present invention to identify local emergency calls in roaming scenarios without the need to rely on user equipment implementation when providing numbers to the user equipment, and avoid maintaining a huge list of local emergency numbers of all roaming partners in the home telecommunications network. According to the present invention, it is hence advantageously possible that that network operators are enabled to deploy a simple, cost efficient, and network based method with minor provisioning effort to handle non-user equipment detected emergency calls when roaming without local breakout.

National regulation defines emergency services by the local numbering plan. If an emergency number (i.e. an emergency call telephone number) is not provisioned to a user equipment (or a terminal equipment such as an IMS UE or generic SIP UE, etc.) and the user dials such an unknown emergency number (i.e. a telephone number for which the user equipment is not aware that it is an emergency number), the user equipment will initiate the call setup as a normal call using the dialed number. Therefore, it is the task of the telecommunications network to detect that the initiated call is dedicated to an emergency service, identify the service and proceed with the right procedures related to this service as assigning an sos-URN (uniform resource name of the sos top level domain, especially as defined according to the 3GPP (Third Generation Partnership Project) and/or IETF (Internet Engineering Task Force standard) to guarantee the routing to the responsible public safety answering point (PSAP).

According to the present invention, improved handling of emergency calls in a roaming scenario is possible in cases where the proxy functionality of the home telecommunications network is used in the roaming scenario, i.e. in cases without local breakout. It is therefore advantageously possible according to the present invention that the responsibility to comply (both regarding the detection which type of emergency is to apply, and regarding the definition of the routing to proceed with the call handling) with the national regulations (especially regarding the numbering plan) relies on the network operator of the visited telecommunications network.

According to the present invention, a voice call is initiated by the user equipment using a telephone number that is a valid emergency call telephone number in the context of the visited telecommunications network. The valid emergency call telephone numbers can vary from country to country and also their number and the associated or assigned emergency types of the emergency call telephone numbers. The telephone number used by the user equipment to initiate the voice call is also called the specific emergency call telephone number. The assumption is that the user equipment is not aware of the fact of using a valid emergency call telephone number, i.e. the initiated voice call is a non-user equipment detected emergency call: The user equipment initially handles the voice call—involving the specific emergency call telephone number—as a normal voice call (as at least part of the locally (in the visited telecommunications network) valid emergency call telephone numbers might not be provided or provisioned to the user equipment). According to the present invention, an exemplary embodiment of the inventive method the comprises the steps of initiating, by the user equipment, of a voice call (like for any other voice call) in a first step via the user equipment transmitting a first message directed to a network node of the home telecommunications network. The first message comprises the specific emergency call telephone number.

In a second step, subsequent to the first step, the specific emergency call telephone number is detected by a telephone number detecting network node of the visited telecommunications network, and a second message is transmitted to the network node of the home telecommunications network. The second message comprises an emergency call information, the emergency call information being indicative of the use of a valid emergency call telephone number in relation of the voice call.

Hence, according to the present invention, the telephone number detecting network node of the visited telecommunications network has an updated database information regarding the current emergency call telephone numbers applicable in the visited telecommunications network. However, this database can be restricted to the emergency telephone numbers applicable in the home telecommunications network, thus comparably small.

In a third step, subsequent to the second step, a third message is generated by the node of the home telecommunications network, the third message being directed to the user equipment, wherein the third message is transmitted to a network node of the visited telecommunications network, and forwarded—as a fourth message—to the user equipment. The third and fourth messages comprise an indication, to the user equipment, to trigger an emergency call procedure towards the visited telecommunications network via a fifth message.

According to the present invention it is preferred that the normal manner is a non-emergency call manner.

According to a further embodiment of the present invention, it is also possible and preferred that the emergency call information comprises
  a uniform resource name, especially related to an emergency type and/or
  an information related to the emergency type and/or
  the specific emergency call telephone number and/or
  a further specific emergency call telephone number.

According to the present invention, it is thereby advantageously possible—according to one variant of the present invention—that the emergency call information does only comprise one bit (i.e. an indication that the initiated voice call relates to an emergency call number). According to further variants of the present invention, the emergency call information comprises, e.g., a uniform resource name (such as a uniform resource name that is not at all related to a specific emergency type or such as a uniform resource name that is related to a specific emergency type). According to still further (alternative or cumulative) variants of the present invention, the emergency call information comprises an information related to the emergency type. Furthermore, (likewise alternatively or cumulatively to the other possible parts of the emergency call information) the emergency call information comprises the specific emergency call telephone number (i.e. the one used by the user equipment when initiating the voice call (or emergency call)). Furthermore (likewise alternatively or cumulatively to the other possible parts of the emergency call information), the emergency call information comprises a further specific emergency call telephone number (i.e. a different emergency call telephone number when compared to the specific emergency call telephone number).

According to a further embodiment of the present invention, it is also possible and preferred that the third message and/or the fourth message comprises a further emergency call information, wherein the further emergency call information comprises
  a uniform resource name, especially related to an emergency type and/or
  an information related to the emergency type and/or
  the specific emergency call telephone number and/or
  a further specific emergency call telephone number.

In a manner analogous to the emergency call information, it is advantageously possible according to the present invention that—according to one variant of the present invention—the further emergency call information does only comprise one bit (i.e. an indication that the initiated voice call relates to an emergency call number). However, this variant at most applies to the third message (and not to the fourth message as this information is not sufficient for the user equipment to have the correct behavior with respect to the fifth message: the user equipment at least needs to know the uniform resource name to direct the emergency call to in case of initiating the emergency call using packet switched procedures). According to further variants of the present invention, the further emergency call information comprises (either in the third message or in the fourth message or in both the third and the fourth message), e.g., a uniform resource name (such as a uniform resource name that is not at all related to a specific emergency type or such as a uniform resource name that is related to a specific emergency type). According to still further (alternative or cumulative) variants of the present invention, the further emergency call information comprises (either in the third message or in the fourth message or in both the third and the fourth message) an information related to the emergency type. Furthermore, (likewise alternatively or cumulatively to the other possible parts of the emergency call information) the further emergency call information comprises (either in the third message or in the fourth message or in both the third and the fourth message) the specific emergency call telephone number (i.e. the one used by the user equipment when initiating the voice call (or emergency call)). Furthermore (likewise alternatively or cumulatively to the other possible parts of the emergency call information), the further emergency call information comprises (either in the third message or in the fourth message or in both the third and the fourth message) a further specific emergency call telephone number (i.e. a different emergency call telephone number when compared to the specific emergency call telephone number).

According to the present invention it is furthermore preferred that the third message is verified by the visited telecommunications network, wherein the third message is especially transmitted to the telephone number detecting network node of the visited telecommunications network.

It is thereby advantageously possible according to the present invention that the verification process can be used to protect the visited telecommunications network from emergency call procedures that are inappropriate. With or without such a verification process, it is advantageously possible and preferred that the third message is especially transmitted to the telephone number detecting network node of the visited telecommunications network (i.e. the network node of the visited telecommunications network that also received the first message and transmitted the second message to the home telecommunications network).

According to a further preferred embodiment of the present invention, the telephone number detecting network node of the visited telecommunications network is
  a session border controller, or
  a network node realizing an interworking border control function, or
  an application layer gateway, or
  a network node realizing a transit and roaming function (TRF), or
  a standalone network node.

Thereby, it is advantageously possible to provide a high degree of flexibility in the realization of the telephone number detecting network node of the visited telecommunications network. The telephone number detecting network node of the visited telecommunications network can be implemented in the form of a new network node of the visited telecommunications network or in the form of an additional functionality of an existing network node, especially one of the mentioned network nodes and especially a network node that is capable to access the SIP signaling traffic.

According to all embodiments of the present invention, the telephone number detecting network node of the visited telecommunications network is to be understood as a telephone number detecting functionality and the manner of implementation of this functionality can be chosen according to the architecture of the visited telecommunications network or the associated technical needs.

According to the present invention it is furthermore preferred that the network node of the home telecommunications network is a network node realizing a proxy call session control function, wherein the network node of the home telecommunications network is especially configured for analyzing and/or detecting the emergency call information.

It is thereby advantageously possible that the network node of the home telecommunications network, especially a network node realizing a proxy call session control function, triggers or invokes the user equipment to initiate an emergency call procedure.

According to a further preferred embodiment of the present invention, the user equipment detects the initiated voice call being an emergency call upon receiving the fourth message.

It is thereby advantageously possible that finally the user equipment is aware of the having initiated an emergency call by originally initiating the voice call via the first message.

Furthermore, the present invention relates to a system for improved handling of emergency calls in a roaming scenario, the system comprising a user equipment, a home telecommunications network and a visited telecommunications network, wherein the user equipment is assigned to the home telecommunications network and wherein the user equipment is connected to the visited telecommunications network, wherein the proxy functionality of the home telecommunications network is used in the roaming scenario, wherein a voice call is initiated by the user equipment using a specific emergency call telephone number being a valid emergency call telephone number in the visited telecommunications network,
wherein the user equipment is configured to initially handle the voice call—involving the specific emergency call telephone number—as a normal voice call (non-UE detected emergency call),
wherein the system is configured such that:
  the voice call is initiated by the user equipment via the user equipment transmitting a first message directed to a network node of the home telecommunications network, the first message comprising the specific emergency call telephone number, wherein the specific emergency call telephone number is detected by a telephone number detecting network node of the visited telecommunications network,
  a second message is transmitted to the network node of the home telecommunications network, the second message comprising an emergency call information, the emergency call information being indicative of the use of a valid emergency call telephone number in relation of the voice call,
  a third message is generated by the node of the home telecommunications network, the third message being directed to the user equipment, wherein the third message is transmitted to a network node of the visited telecommunications network, and forwarded, as a fourth message, to the user equipment, the third and fourth messages comprising an indication, to the user equipment, to trigger an emergency call procedure in accordance to the configuration of the visited telecommunications network via a fifth message.

Thereby, it is advantageously possible to provide a system that is capable of identifying local emergency calls in roaming scenarios without local breakout and without the need to rely on user equipment implementation when providing numbers to the user equipment. Consequently, it is advantageously possible to avoid maintaining a huge list of local emergency numbers of all roaming partners in the home telecommunications network.

According to the present invention it is furthermore preferred—especially with respect to a further exemplary embodiment of the inventive system—that the system is configured such that the emergency call information comprises
  a uniform resource name, especially related to an emergency type and/or
  an information related to the emergency type and/or
  the specific emergency call telephone number and/or
  a further specific emergency call telephone number.

According to a further embodiment of the present invention, it is also possible and preferred that the system is configured such that the third message and/or the fourth message comprises a further emergency call information, wherein the further emergency call information comprises
  a uniform resource name, especially related to an emergency type and/or
  a category information related to the emergency type and/or
  the specific emergency call telephone number and/or
  a further specific emergency call telephone number.

Furthermore, the present invention relates to a telecommunications network or a network node, wherein the telecommunications network and/or the network node is either part of the home telecommunications network of the system or of the visited telecommunications network of the system.

Thereby, it is advantageously possible to provide a telecommunications network and/or a network node such that local emergency calls in roaming scenarios that do not use local breakout can be handled easily and without the need to rely on user equipment implementation when providing numbers to the user equipment.

Additionally, the present invention relates to a program comprising a computer readable program code which, when executed on a computer or on a network node of a home telecommunications network or on a network node of a visited telecommunications network, or in part on the network node of the home telecommunications network and in part on the network node of the visited telecommunications network, causes the computer or the network node of the home telecommunications network or the network node of the visited telecommunications network to perform an exemplary embodiment of the inventive method.

Still additionally, the present invention relates to a computer program product for a home telecommunications network and/or a visited telecommunications network, the computer program product comprising a computer program stored on a storage medium, the computer program comprising program code which, when executed on a computer or on a network node of a home telecommunications network or on a network node of a visited telecommunications network, or in part on the network node of the home telecommunications network and in part on the network node of the visited telecommunications network, causes the computer or the network node of the home telecommunica-tions network or the network node of the visited telecommunications network to perform an exemplary embodiment of the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a first telecommunications network, e.g. a mobile communication network such as a public land mobile network, and a second telecommunications network, likewise e.g. a mobile communication network such as a public land mobile network, are schematically shown. The first telecommunications network is associated to (or assigned to) a user equipment 20 (or the user equipment 20 is assigned to the first telecommunications network), resulting in the first telecommunications network being the home telecommunications network 100 of the user equipment 20. The present invention relates to the situation of the user equipment 20 being in a roaming situation, i.e. the user equipment 20 being connected not to the home telecommunications network 100 but to the second telecommunications network, which is referred to by the term visited telecommunications network 200.

The home telecommunications network 100 comprises a first access network 110 or access part and a first core network 120. The home telecommunications network 100 is, e.g., a cellular telecommunications network comprising typically a plurality of network cells (not depicted in FIG. 1). The first access network 110 comprises at least one first access entity 111 such as (especially in case of mobile communication networks) a base station entity enabled to serve a user equipment 20. In case of the home telecommunications network 100 being a mobile communication network, the first access entity 111 typically serves a radio cell, i.e. a radio coverage are of the access entity (or base station entity) or associated to the first access entity 111, and the user equipment 20 is able to be connected to the first access entity 111 via a radio link or a wireless communication link. In case of the home telecommunications network 100 being a fixed communication network, the first access entity 111 is typically a network access point to which the user equipment 20 is able to be connected by a wireline connection, or the first access entity 111 is connected to a local wireless access point, providing the possibility for the user equipment 20 to be connected to the first access entity 111 via a wireless communication link. The visited telecommunications network 200 comprises a second access network 210 or access part and a second core network 220. The visited telecommunications network 200 is, e.g., a cellular telecommunications network comprising typically a plurality of network cells (not depicted in FIG. 1). The second access network 210 comprises at least one second access entity 211 such as (especially in case of mobile communication networks) a base station entity enabled to serve the user equipment 20. In case of the visited telecommunications network 200 being a mobile communication network, the second access entity 211 typically serves a radio cell, i.e. a radio coverage are of the second access entity 211 (or base station entity) or associated to the second access entity 211, and the user equipment 20 is able to be connected to the second access entity 211 via a radio link or wireless communication link. In case of the visited telecommunications network 200 being a fixed communication network, the second access entity 211 is typically a network access point to which the user equipment 20 is able to be connected by a wireline connection, or the second access entity 211 is connected to a local wireless access point, providing the possibility for the user equipment 20 to be connected to the first access entity 111 via a wireless communication link.

In the exemplary representation of a roaming situation depicted in FIG. 1, the user equipment 20 is connected—while being assigned (or associated) to the home telecommunications network 100—to the second access entity 211 of the visited telecommunications network 200. Furthermore, a further access entity 212 is schematically shown in FIG. 1 as being part of the visited telecommunications network 200.

In such a roaming situation of the user equipment 20, in case that a type of call handling involving local breakout is used (i.e. the proxy functionality of the visited telecommunications network 200 (and not of the home telecommunications network 100) is used), a network node of the visited telecommunications network 200 is primarily used for call handling, such as a proxy call session control function of the visited telecommunications network 200. In such a situation, such a network node of the visited telecommunications network 200 should know any valid emergency call telephone numbers that can be used within the visited telecommunications network 200.

However, in case that a type of call handling avoiding local breakout is used (i.e., the proxy functionality of the home telecommunications network 100 is used), either the user equipment 20 would normally need to be provisioned with the valid emergency call telephone numbers that can be used within the visited telecommunications network 200, or a network node of the home telecommunications network 100 would need to have (or at least be able to easily access) this information, i.e. the valid emergency call telephone numbers that can be used within this visited telecommunications network 200 but also the valid emergency call telephone numbers of any other possible visited telecommunications network of any roaming partner of the home telecommunications network 100. The maintenance efforts of such a database are quite important, especially for network operators having a comparatively important number of roaming partners.

The present invention solves this problem by removing the need both to provision the user equipment 20 or a network node of the home telecommunications network 100 with these potentially changing data: Upon the user equipment 20 initiating a voice call using an emergency call telephone number (among the (possibly numerous) valid emergency call telephone numbers accessible in the visited telecommunications network 200), hereinafter also called specific emergency call telephone number, the user equipment 20 is not necessarily aware of the fact that this voice call relates to a valid emergency call telephone number within the visited telecommunications network 200 (non-UE detected emergency call). As a consequence, the user equipment 20 handles the voice call as a normal voice call.

According to the present invention, the fact that the voice call initiated by the user equipment 20 involves a valid emergency call telephone number within the visited telecommunications network 200 is first detected by the visited telecommunications network 200 (despite the fact that the proxy functionality of the home telecommunications network 100 is used for processing the voice call), and this fact communicated via—an emergency call information—to the home telecommunications network 100, after which the home telecommunications network 100 in turn requests the user equipment 20 to trigger an emergency call procedure towards the visited telecommunications network 200. Hence, according to the present invention, local breakout is not used and local emergency numbers are not provided to the user equipment 20. A node in the visited network is detecting a call setup as an emergency call by analyzing the requested number (of the voice call). This node in the visited network typically assigns a corresponding sos-URN (uniform resource name of the sos top level domain) which can be added, together with an indication of emergency call request, into the signaling of the call setup to the home network. The node in the home network can use this information to apply the procedures to handle non-UE-detected emergency calls.

Figure 2:
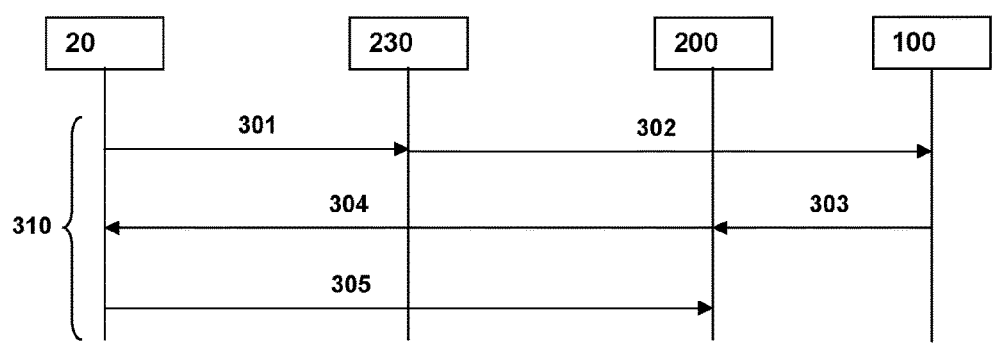
FIG. 2 schematically illustrates a communication diagram between the user equipment, the home telecommunications network and the visited telecommunications network, wherein the exchange of different messages is shown in view of initiating an emergency call.

An exemplary embodiment of the inventive method is represented schematically in greater detail in FIG. 2.

In a first step, the voice call 310 is initiated by the user equipment 20 via the user equipment 20 transmitting a first message 301. The first message 301 is directed to a network node of the home telecommunications network 100, which will typically by the proxy call session control function of the home telecommunications network 100. This proxy call session control function as an example of a network node of the home telecommunications network 100 is schematically represented in FIG. 1 by means of a box and reference sign 140. As for any normal voice call, the first message 301 comprises the telephone number dialed by the user equipment 20, hence in the situation considered here, the specific emergency call telephone number.

In a second step, subsequent to the first step, the first message 301 is received by a network node 230 of the visited telecommunications network 200 prior to being transmitted to the home telecommunications network 100. In the second step, the specific emergency call telephone number is detected by the visited telecommunications network 200 (based on a database or other information storage component relating to the valid emergency call telephone numbers of only the concerned network, i.e. in this case typically of the visited telecommunications network 200); the corresponding network node of the visited telecommunications network 200 is consequently also called telephone number detecting network node 230 of the visited telecommunications network 200. The telephone number detecting network node 230 of the visited telecommunications network 200 transmits a second message 302 to the network node of the home telecommunications network 100, and the second message 302 comprises an emergency call information, the emergency call information being indicative of the use of a valid emergency call telephone number in relation of the voice call 310. Via the emergency call information, the home telecommunications network 100 is informed at least that a valid emergency call telephone number has been used by the user equipment 20 when initiating the voice call 310.

The emergency call information transmitted by the second message 302 can, e.g., correspond—according to a variant of the present invention—to only one bit (or a flag information), indicating that a valid emergency call telephone number has been used by the user equipment 20 when initiating the voice call 310. According other variants of the present invention the emergency call information comprises (either additional to the flag information or instead):

a uniform resource name, especially related to an emergency type and/or
an information related to the emergency type and/or
the specific emergency call telephone number and/or
a further specific emergency call telephone number.

In a third step, subsequent to the second step, a third message 303 is generated by the node of the home telecommunications network 100—typically a network node realizing a proxy call session control function 140 within the home telecommunications network 100. The third message 303 is directed to the user equipment 20, and it is transmitted to a network node of the visited telecommunications network 200—either the telephone number detecting network node 230 of the visited telecommunications network 200 or another network node of the visited telecommunications network 200; in FIG. 2, the situation of the third message 303 being transmitted generally "to the visited telecommunications network 200" (i.e. not necessarily to the telephone number detecting network node 230) is represented however, as this telephone number detecting network node 230 is also part of the visited telecommunications network 200, this also refers to the case that the third message 303 is received by the telephone number detecting network node 230. The third message 303 is forwarded, as a fourth message 304, to the user equipment 20, the third and fourth messages 303, 304 comprising an indication (e.g. in the form of a "380 Alternative Service"-message), to the user equipment 20, to trigger an emergency call procedure towards the visited telecommunications network 200 via a fifth message 305.

According to variants of the present invention, the third message 303 and/or the fourth message 304 comprise a further emergency call information. Either the further emergency call information of the third message 303 is identical to the further emergency call information of the fourth message 304 (and hence called "further emergency call information"), or the further emergency call information of the third message 303 is not identical to the further emergency call information of the fourth message 304; in this latter case the further emergency call information of the third message 303 is also called first further emergency call information and the further emergency call information of the fourth message 304 is also called second further emergency call information. According to variants of the present invention, the further emergency call information (and, if applicable, the first further emergency call information and/or the second further emergency call information) comprises:

a uniform resource name, especially related to an emergency type and/or
an information related to the emergency type and/or
the specific emergency call telephone number and/or
a further specific emergency call telephone number.

In short, in an exemplary embodiment, the inventive method enables a node in the visited telecommunications network 200 (i.e. the telephone number detecting network node 230; examples thereof are: a Session border controller (SBC), an Interworking Border Control Function (IBCF)) to detect the emergency call by analyzing the dialed number (of the voice call 310) and to put an indication into the call setup signaling to indicate to the proxy of the home telecommunications network 100 (P-CSCF or SIP proxy, reference sign 140) that the roaming user equipment 20 is initiating an emergency call. Additionally the telephone number detecting network node 230 in the visited telecommunications network 200 assigns an sos-URN related to the type of emergency call deduced from the requested number and put this sos-URN together with an optional additional indication into the call setup signaling to the proxy of the home telecommunications network 100 (P-CSCF or SIP Proxy). The node in the home network (P-CSCF) can use this information to apply the procedures to handle non-UE-detected emergency calls. This enables the network operators to implement a simple mechanism to handle non-UE detected emergency calls in roaming scenarios where local breakout is not used.

In an IMS roaming scenario for mobile users or nomadic fixed network users when no P-CSCF (proxy call session control function) is in visited telecommunications network 200 and all calls are home routed (i.e. the proxy call session control function of the home telecommunications network 100 is used). Additionally, all or some local emergency numbers (i.e. of the visited telecommunications network 200) are not provisioned to the user equipment 20. An SBC or IBCF in visited network detect an emergency call setup by analyzing the dialed number. The telephone number detecting network node 230 of the visited telecommunications network 200 (especially a session border controller (SBC) or an interworking border control function (IBCF)) identifies the type of emergency service and assigns a corresponding sos-URN. The telephone number detecting network node 230 of the visited telecommunications network 200 (typically SBC or IBCF) sends back—especially in a session setup signaling, e.g., as a Tel-URI parameter or sip-feature-tag or new sip header or a new SIP message body—an indication that this is a request for an emergency call. Instead or together to this indication in session setup signaling (e.g. as a Tel-URI parameter or sip-feature-tag or new sip header or new SIP message body), the assigned sos-URN is included. The proxy call session control function 140 (P-CSCF) in the home telecommunications network 100 can read the related information and trigger the procedures for non-UE detected emergency calls.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for improved handling of emergency calls in a roaming scenario, wherein a user equipment is assigned to a home telecommunications network and wherein the user equipment is connected to a visited telecommunications network, wherein a proxy functionality of the home telecommunications network is used in the roaming scenario, wherein a voice call is initiated by the user equipment using a specific emergency call telephone number, wherein the specific emergency call telephone number is a valid emergency call telephone number in the visited telecommunications network, wherein the user equipment initially handles the voice call as a normal voice call, wherein the method comprises:
   in a first step, transmitting, by the user equipment so as to initiate the voice call, a first message directed via the visited telecommunications network to a network node of the home telecommunications network, the first message comprising the specific emergency call telephone number;
   in a second step, subsequent to the first step, receiving, by the telephone number detecting network node of the visited telecommunications network, the first message, detecting, by the telephone number detecting network node, the specific emergency call telephone number, and transmitting, by the telephone number detecting network node to the network node of the home telecommunications network, a second message comprising an emergency call information, the emergency call information being indicative of the use of a valid emergency call telephone number in relation of the voice call; and
   in a third step, subsequent to the second step, a third message is generated by the node of the home telecommunications network, the third message being directed to the user equipment, wherein the third message is transmitted to a network node of the visited telecommunications network, and forwarded, as a fourth message, to the user equipment, the third and fourth messages comprising an indication, to the user equipment, to trigger an emergency call procedure in accordance to the configuration of the visited telecommunications network via a fifth message.

2. The method according to claim 1, wherein the normal manner is a non-emergency call manner.

3. The method according to claim 1, wherein the emergency call information comprises:
   a uniform resource name; and/or
   an information related to an emergency type; and/or
   the specific emergency call telephone number; and/or
   a further specific emergency call telephone number.

4. The method according to claim 1, wherein the third message and/or the fourth message comprises a further emergency call information, wherein the further emergency call information comprises:
   a uniform resource name; and/or
   an information related to the emergency type; and/or
   the specific emergency call telephone number; and/or
   a further specific emergency call telephone number.

5. The method according to claim 1, wherein the third message is verified by the visited telecommunications network, wherein the third message is transmitted to the telephone number detecting network node of the visited telecommunications network.

6. The method according to claim 1, wherein the telephone number detecting network node of the visited telecommunications network is:
   a session border controller; or
   a network node realizing an interworking border control function; or
   an application layer gateway; or
   a network node realizing a transit and roaming function (TRF); or
   a standalone network node.

7. The method according to claim 1, wherein the network node of the home telecommunications network is a network node realizing a proxy call session control function, and wherein the network node of the home telecommunications network is configured for analyzing and/or detecting the emergency call information.

8. The method according to claim 1, wherein the user equipment detects the initiated voice call being an emergency call upon receiving the fourth message.

9. A system for improved handling of emergency calls in a roaming scenario, the system comprising:
   a home telecommunications network comprising a network node;
   a visited telecommunications network including a telephone number detecting network node; and
   a user equipment assigned to the home telecommunications network but connected to the visited telecommunications network, wherein a proxy functionality of the home telecommunications network is used in a roaming scenario of the user equipment,
   wherein the user equipment is configured to transmit, so as to initiate a voice call using a specific emergency call telephone number that is a valid emergency call telephone number in the visited telecommunications network, a first message directed via the visited telecommunications network to a network node of the home telecommunications network, the first message comprising the specific emergency call telephone number,
   wherein the user equipment is further configured to initially handle the voice call as a normal voice call,
   wherein the telephone number detecting network node of the visited telecommunications network is configured to receive the first message, to detect the specific emergency call telephone number, and to transmit a second message directed to the network node of the home telecommunications network, the second message comprising an emergency call information, the emergency call information being indicative of the use of a valid emergency call telephone number in relation to the voice call,
   wherein the network node of the home telecommunications network is configured to receive the second message, and to generate a third message directed to the user equipment, wherein a network node of the visited telecommunications network is configured to receive the third message and to forward the third message, as a fourth message, to the user equipment, and wherein the third and fourth messages comprise an indication, to the user equipment, to trigger an emergency call procedure in accordance to the configuration of the visited telecommunications network via a fifth message.

10. The system according to claim 9, wherein the emergency call information comprises:
    a uniform resource name; and/or
    an information related to the emergency type; and/or
    the specific emergency call telephone number; and/or
    a further specific emergency call telephone number.

11. The system according to claim 9, wherein the third message and/or the fourth message comprises a further emergency call information, wherein the further emergency call information comprises:
    a uniform resource name; and/or
    an category information related to the emergency type; and/or
    the specific emergency call telephone number; and/or
    a further specific emergency call telephone number.

12. One or more non-transitory computer-readable mediums having processor-executable instructions stored thereon for improved handling of emergency calls in a roaming scenario, wherein a user equipment is assigned to a home telecommunications network and wherein the user equipment is connected to a visited telecommunications network, wherein a proxy functionality of the home telecommunications network is used in the roaming scenario, wherein a voice call is initiated by the user equipment using a specific emergency call telephone number, wherein the specific emergency call telephone number is a valid emergency call telephone number in the visited telecommunications network, wherein the user equipment initially handles the voice call as a normal voice call, wherein the processor-executable instructions, when executed, facilitate:

in a first step, transmitting, by the user equipment so as to initiate the voice call, a first message directed via the visited telecommunications network to a network node oldie home telecommunications network, the first message comprising the specific emergency call telephone number;

in a second step, subsequent to the first step, receiving, by the telephone number detecting network node of the visited telecommunications network, the first message, detecting, by the telephone number detecting network node, the specific emergency call telephone number, and transmitting, by the telephone number detecting network node to the network node of the home telecommunications network, a second message comprising an emergency call information, the emergency call information being indicative of the use of a valid emergency call telephone number in relation of the voice call; and in a third step, subsequent to the second step, a third message is generated by the node of the home telecommunications network, the third message being directed to the user equipment, wherein the third message is transmitted to a network node of the visited telecommunications network, and forwarded, as a fourth message, to the user equipment, the third and fourth messages comprising an indication, to the user equipment, to trigger an emergency call procedure in accordance to the configuration of the visited telecommunications network via a fifth message.

* * * * *